Oct. 22, 1963    D. S. WALKER    3,107,514
AIRCRAFT HEADING ALIGNMENT APPARATUS AND METHOD
Filed Dec. 26, 1961

INVENTOR.
DAVID S. WALKER
BY
ATTORNEY 3,107,514
AIRCRAFT HEADING ALIGNMENT APPARATUS AND METHOD
David S. Walker, Little Neck, N.Y., assignor to Sperry Rand Corporation, Great Neck, N.Y., a corporation of Delaware
Filed Dec. 26, 1961, Ser. No. 161,844
7 Claims. (Cl. 73—1)

This invention relates to directional reference systems for aircraft and particularly to heading alignment apparatus and methods associated therewith.

This invention provides a simplified structure and method for aligning a heading indicating element of a directional reference system for aircraft with the magnetic meridian when the system is initially placed into operation. Previously complex and expensive methods of aligning the indicating element were necessary which included bore sighting, the use of transfer gyros, or the use of runway marks.

The prior art systems have a number of disadvantages, for example, bore sighting requires cumbersome fixed ground equipment and additional optical equipment aboard the aircraft. Further, access windows must be provided in the airplane to permit light rays to reach the directional gyroscope structure, particularly if the gyroscope is shock mounted.

The transfer gyro technique requires an additional piece of delicate ground equipment, a self-contained power supply and direct mechanical and electrical signal connections to the aircraft. These connections are inconvenient, particularly on large aircraft where the fuselage may be quite a distance above the ground.

Runway marks afford an inaccurate reference at best and the aircraft has to be maneuvered to endeavor to align with the marks. This is a cumbersome operation particularly with large aircraft.

It is a primary objective of the present invention to provide an aircraft heading alignment apparatus and method which is simple, accurate and inexpensive.

It is a further object of the present invention to provide an aircraft heading alignment apparatus and method which provides accurate heading alignment automatically during the take-off run.

The above objects are achieved by the present invention by using the center line of the runway as a heading reference. The known heading of the runway is set on the heading indicating element prior to take-off while it is declutched from the servo system that normally connects the element to a directional gyroscope. The heading indicating element and the directional gyroscope are rapidly synchronized prior to take-off. During the take-off any errors between the actual heading of the aircraft and the known heading of the runway are integrated and the integrated error signal corrects the heading indicating element to provide a heading indication at the end of the take-off run that coincides with the runway heading.

Referring to the drawings.

Figure 1:
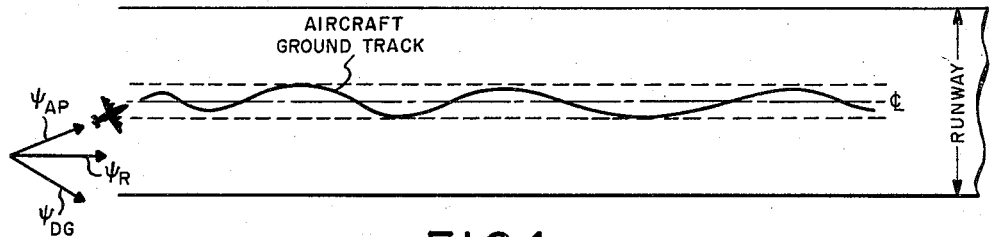
FIG. 1 shows the ground track of an aircraft during a typical take-off utilizing the method of the present invention.

The present invention aligns the directional reference system of an aircraft and particularly its heading indicating element to the actual heading of the aircraft by utilizing the known heading of the center line of a runway as the heading reference. In accordance with the present invention, the pilot before starting the take-off run endeavors to align the longitudinal axis of the aircraft approximately with the center line of the runway as shown in FIG. 1. This alignment is only approximate and usually results in the actual heading of the aircraft, as indicated by the arrow $\psi_{AP}$, deviating somewhat from the heading of the runway, as indicated by the arrow $\psi_R$. The directional gyroscope reference may be at any heading $\psi_{DG}$. This deviation is exaggerated in FIG. 1 for clarity. This initial misalignment must be corrected to provide an accurate heading indication. To correct the misalignment, during the take-off run the pilot endeavors to maintain the aircraft continuously aligned with the center line of the runway. However, due to human factors the pilot can only maintain the aircraft approximately aligned with the runway center line during the take-off run resulting in the ground track of the aircraft having an irregular sinusoidal shape caused by deviation of the craft from the center line.

Since the deviations from the center line are substantially equal and periodic in time, the initial misalignment may be corrected by integrating the heading deviations of the aircraft with respect to the runway during the take-off run in a manner to be fully described.

Figure 2:
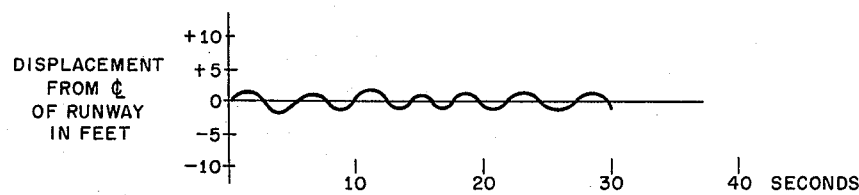
FIG. 2 is a graph of displacement of the aircraft from the center line of the runway in feet vs. time in seconds.

The pilot's response is more a function of time than distance. He actually keeps within a certain displacement of the center line within a certain time interval as shown in FIG. 2. Therefore, an integration of heading error, i.e., the error between the actual heading of the aircraft and the known heading of the runway, with time is a better indication of runway heading than integration with distance down the runway.

Figure 3:
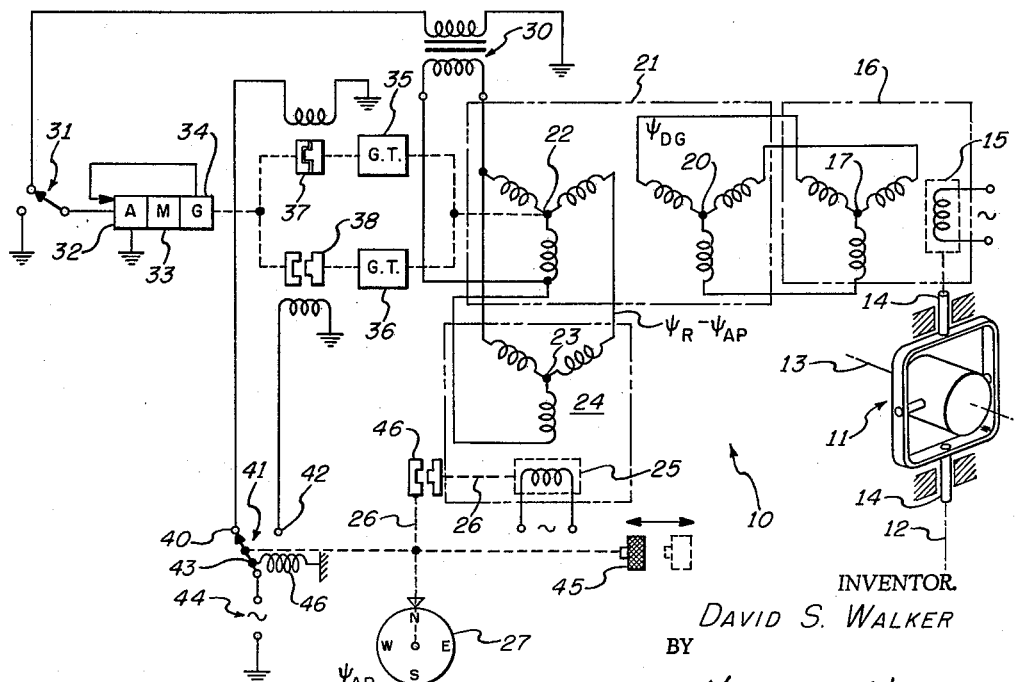
FIG. 3 is a schematic diagram of a directional reference system incorporating the present invention.

Referring now to FIG. 3, a directional reference system 10 incorporating the apparatus of the present invention is shown. The system 10 includes a directional gyroscope 11 mounted for rotation about a vertical axis 12 which has a spin axis 13 that is maintained tangent to the earth's surface by conventional leveling means not shown. The directional gyroscope 11 is mounted for rotation in azimuth by shafts 14 mounted in bearings fixed to the aircraft.

The rotor 15 of a synchro transmitter 16 is mounted upon the shaft 14. The rotor 15 is energized from the aircraft 400-cycle supply to produce a magnetic field which induces voltages in the Y-connected coils of its stator 17. The stator 17 is electrically connected to the corresponding coils of a stator 20 of a synchro differential transformer 21. The Y-connected coils of the rotor 22 of the differential transformer 21 are in turn connected to the corresponding stator coils 23 of a synchro receiver 24. The rotor 25 of the synchro receiver 24 is connected to a heading shaft 26 upon which is mounted a heading indicator card or compass card 27.

The rotor 15 of the synchro transmitter 16 produces a magnetic field which produces voltages in the stator 20 of the differential transformer 21 which in turn are reproduced in the corresponding coils of the stator 23 of the synchro receiver 24. These voltages act on the energized rotor 25 causing the heading shaft 26 to be rotated thereby driving the compass card 27 to provide a visual indication of the aircraft heading which is read against a fixed lubber line.

The rotor 22 of the differential transformer 21 is connected to a signal transformer 30 which has its output winding connected through a nose wheel switch 31 to the input of an amplifier 32. The output of the amplifier 32 is connected to a motor 33 which in turn drives a tachometer generator 34. The output of the tachometer generator 34 is fed back to the input of the amplifier 32 for rate stabilization purposes. The motor 33 is further connected to rotate the rotor 22 of the differential transformer 21 through the fast gear train 35 of the slow gear train 36 depending upon whether the clutch 37 or the clutch 38, respectively, is energized. The clutch 37 has its winding connected to a contact 40 of a switch 41 while the clutch 38 has its winding connected to a contact 42 of the switch 41. The contact arm 43 of the switch 41 is energized by an alternating current source 44.

A push-to-set knob 45 is connected to position the contact arm 43. The knob 45 is also connected to a clutch 46 that is mounted on the shaft 26 between the rotor 25 and the compass card 27. Further, the knob 45 is connected to manually rotate the compass card 27 when pushed inwardly and then rotated. The knob 45 is spring loaded to the right as viewed in the drawing by a spring 46.

In operation, as shown in FIG. 1, the heading of the aircraft $\psi_{AP}$, is approximately aligned with the center line of the runway $\psi_R$. The spin axis of the directional gyro may be in any azimuthal position as indicated by the arrow $\psi_{DG}$.

Prior to the beginning of the take-off run with the aircraft approximately aligned with the center line of the runway, the spring biased knob 45 as shown in FIG. 3 is pushed in against the force of the spring 46, i.e., leftward as viewed in the drawing, and the known heading of the runway $\psi_R$ is set on the compass card 27 by rotating the knob 45. Pushing in the knob 45 causes the clutch 46 to disconnect the rotor 25 from the compass card 27. Simultaneously, the contact arm 43 of the switch 41 is placed in a leftward position to abut against the contact 40 thereby energizing the clutch 37 which connects the motor 33 through the fast gear train 35 to the rotor 22. With this servo loop in fast follow-up, the rotor 22 of the differential transformer 21 is quickly synchronized with the directional gyro 11. This also synchronizes the rotor 25 of the synchro received 24 with the directional gyro 11. The aircraft nose wheel switch 31 is closed as shown whenever the aircraft weight is acting on the nose wheel.

At the beginning of a take-off run, just prior to the time that the aircraft goes down the runway, the knob 45 is released and the spring return places the knob 45 in its outward or normal position thereby engaging the clutch 46 which connects the rotor 25 to the compass card 27. Thus, just prior to the take-off run, the heading indicated by the compass card 27 is the known heading of the center line of the runway $\psi_R$ although the actual heading of the aircraft $\psi_{AP}$ at that time may be different from the runway heading $\psi_R$. With the knob 45 to the right as described, the contact arm 43 of the switch 41 abuts the contact 42 thereby deenergizing the clutch 37 and energizing the clutch 38. In this condition the motor 33 is connected through the slow gear train 36 to the rotor 22 thereby placing the follow-up servo loop in an integrating mode of operation.

As the aircraft goes down the runway on its take-off run, the pilot endeavors to follow the center line of the runway. Assuming that the actual heading of the aircraft $\psi_{AP}$ is different from the runway heading $\psi_R$ as shown in FIG. 1, as the pilot turns the aircraft towards the center line of the runway, an electrical signal is produced in the synchro transmitter 16 which has an amplitude and phase representative of the magnitude and sense of the angle through which the aircraft is turned. This signal is transmitted to the differential transformer 21 and is reproduced in its rotor 22. The signal from the rotor 22 is transmitted to the synchro receiver 24 which immediately causes the compass card 27 to be rotated in accordance therewith in a direction and through an angle depending upon the phase and amplitude of the signal.

The signal from the rotor 22 is also connected through the transformer 30 to energize the motor 33 which drives through the slow gear train 36 and slowly rotates the rotor 22 in a direction which tends to cause the signal from the rotor 22 to go to zero. The rotation of the rotor 22 in turn provides an electrical signal to the synchro receiver 24 which causes the rotor 25 thereof to drive the compass card 27 in a direction to return it to the runway heading $\psi_R$. If, for purposes of example, the longitudinal axis of the aircraft remained aligned with the runway heading $\psi_R$ for an appreciable length of time, the integrating action of the follow-up loop due to the slow gear train 36 would ultimately return the compass card 27 to the runway heading $\psi_R$ when the signal from the rotor 22 was driven to zero.

In actual practice, as the aircraft proceeds down the runway, the longitudinal axis of the aircraft, i.e., the heading of the aircraft $\psi_{AP}$ will vacillate from the center line of the runway by a small amount as indicated in FIGS. 1 and 2 thereby producing a continuously varying error signal from the rotor 22. Thus any error signal from the rotor 22 of the differential transformer 21 is occasioned by deviation of the actual heading of the aircraft with the known heading of the runway during the take-off run, i.e., $\psi_R \pm \psi_{AP}$.

By means of the integrating action of the follow-up loop due to the slow gear train 36, this error will be integrated or effectively eliminated. Assuming for example a 50-second take-off run, the slow follow-up loop may have a 20-second time constant. During the take-off run, the heading deviation error is reduced to zero and the synchro receiver 24 is thus synchronized with the compass card 27 and the directional gyroscope 11. This means that the compass card 27 continues to indicate the heading of the runway during the take-off run which now equals the heading of the aircraft since $\psi_R - \psi_{AP} = 0$.

At the time of lift-off when the weight of the aircraft is off the nose wheel, the switch 31 is connected to ground thereby grounding the input to the amplifier 32 which locks the rotor 22 of the differential transformer 21. The compass card 27 is now synchronized accurately to indicate the heading of the aircraft and controlled by the directional gyroscope 11 to operate in its normal mode of operation.

It will be noted that by utilizing the present invention, a high degree of accuracy can be achieved since undesirable effects due to the gyro mounting as well as body bending effects are integrated out during the alignment procedure. Further, no additional ground equipment is required and the alignment procedure may be quickly accomplished by flight personnel without any delay of the aircraft flight schedule.

Data on take-off runs of large commercial and military aircraft indicate that the pilot usually keeps within plus or minus one foot of the center of the runway without any conscious effort. Small aircraft are more maneuverable and even easier to control. Assuming a 5,000 foot take-off run, the maximum heading error $\psi_E$ in the integration, due to pilot maneuvering, is $$\Psi_E = \sin^{-1} \frac{1}{5,000}$$

Therefore, $\psi_E$ is less than one minute of arc.

Although the present invention has been described with respect to a compass system having only a directional gyroscope as a directional reference, the invention is equally applicable to other types of directional reference systems, e.g., gyromagnetic compass systems.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. A directional reference system comprising:
 (a) directional reference means,
 (b) heading indicating element means,
 (c) means positioning said element means and normally controlled by the error between said directional reference means and said element means,

(d) means for setting said element means to the known heading of a runway prior to a take-off run, (e) means for eliminating any error between said directional reference means and said element means prior to the take-off run, (f) and means effective during the take-off run for integrating any error between the actual heading of the aircraft and the known heading of the runway during said take-off run and for correcting said element accordingly.

2. A directional reference system comprising.

(a) a directional gyroscope, (b) a heading indicating element, (c) means positioning said element and normally controlled by the error between said gyroscope and said element, (d) means for setting said element to the known heading of a runway prior to a take-off run, (e) means for eliminating any error between said gyroscope and said element prior to the take-off run, (f) and means effective during the take-off run for integrating any error between the actual heading of the aircraft and the known heading of the runway during said take-off run and for correcting said element accordingly.

3. A directional reference system comprising:

(a) a directional gyroscope, (b) a heading indicating element, (c) means positioning said element and normally controlled by the error between said gyroscope and said element, (d) means including clutch means for setting said element to the known heading of a runway prior to a take-off run independently of the operation of said positioning means, (e) follow-up means for rapidly eliminating any error between said gyroscope and said element prior to the take-off run, (f) and integrating means responsive to the heading error and effective during the take-off run for integrating any error between the actual heading of the aircraft and the known heading of the runway during said take-off run and for correcting said element accordingly.

4. A directional reference system comprising:

(a) a directional gyroscope, (b) a heading indicating element, (c) servo means positioning said element and normally controlled by the error between said gyroscope and said element, (d) means for declutching said element from said servo means and setting said element to the known heading of a runway prior to a take-off run, (e) fast follow-up means responsive to the error between said gyroscope and said element for rapidly eliminating any error therebetween prior to the take-off run, (f) means for simultaneously clutching said servo means and said element and establishing auxiliary integrating means effective during the take-off run and responsive to the error between the actual heading of the aircraft and the known heading of the runway for integrating said heading error during said take-off run and for driving said element in accordance therewith.

5. In a directional reference system having servo means normally positioning a heading indicating element in accordance with the error between a directional gyroscope and said element, (a) means for independently setting said element to the known heading of a runway prior to a take-off run, (b) means for eliminating any error in said servo means prior to the take-off run, (c) and means responsive to said directional gyroscope during the take-off run for integrating any error between the actual heading of the aircraft and the known heading of the runway during said run and for correcting said element accordingly.

6. A method of aligning a heading indicating element of a directional reference system for aircraft including the steps of, (a) aligning the aircraft approximately with the center line of a runway, (b) setting the heading indicating element to the known heading of the runway prior to a take-off run, (c) eliminating any error between a directional gyroscope of said system and said element prior to a take-off run, (d) and integrating any error between the actual heading of the aircraft and the known heading of the runway during the take-off run for correcting said element accordingly.

7. A method of aligning a heading indicating element of a directional reference system for aircraft including the steps of, (a) approximately aligning the longitudinal axis of an aircraft containing said system with the center line of a runway, (b) setting the heading indicating element to the known heading of the runway prior to a take-off run, (c) synchronizing a directional reference means with said heading indicating element prior to a take-off run, (d) integrating any error occasioned by deviations of the actual heading of the aircraft from the known heading of the runway during the take-off run, (e) and correcting said element in accordance with said integrated error.

References Cited in the file of this patent
UNITED STATES PATENTS

| | | |
|---|---|---|
| 2,748,486 | Lord et al. | June 5, 1956 |
| 2,887,873 | Halpern et al. | May 26, 1959 |
| 3,028,598 | Gibbs et al. | Apr. 3, 1962 |
| 3,056,290 | Kishel | Oct. 2, 1962 |